United States Patent
Parker et al.

[15] 3,677,390
[45] July 18, 1972

[54] LEAF ALIGNING METHOD AND MACHINERY

[72] Inventors: Samuel A. Parker, Maysville; Edwin L. Wilding, Louisville, both of Ky.

[73] Assignees: Griffin & Company; Louis Scheu, Jr., Louisville, Ky.; Samuel A. Parker, ; part interest to each

[22] Filed: Aug. 5, 1970

[21] Appl. No.: 61,350

[52] U.S. Cl. ...........................................198/33 R, 221/173
[51] Int. Cl. .....................................................B65g 47/24
[58] Field of Search ....................198/33 R, 33 AA; 222/195; 221/173

[56] References Cited

UNITED STATES PATENTS 2,618,373  11/1952  Hathaway..........................198/33 R1
3,439,793  4/1969  Rokestraw.............................198/33

Primary Examiner—Evon C. Blunk
Assistant Examiner—H. S. Lane
Attorney—Wood, Herron & Evans

[57] ABSTRACT

Tobacco leaves are aligned in troughs by a combination of mechanical vibrations, rotating doffer structure and optional air flow. The leaves are deposited on a vibrated receiving surface and are conveyed onto longitudinal parallel troughs separated by rims. Skew leaves initially lie on the rims across the troughs, while aligned leaves drop into the troughs. The doffer means includes one or more hubs extending across the troughs and rims, and arms extending from the hubs which brush or move unaligned leaves unsymmetrically to turn them and thereby reorient them. Air orifices may be included in the rims and/or doffer arms to lift or turn unaligned leaves which lie on the trough rims and reorient them.

14 Claims, 7 Drawing Figures

Patented July 18, 1972

Samuel Alex Parker
Edwin L. Wilding
Wood, Herron & Evans
ATTORNEYS

Patented July 18, 1972

INVENTORS
Samuel Alex Parker
Edwin L. Wilding
BY
Wood, Herron & Evans
ATTORNEYS

LEAF ALIGNING METHOD AND MACHINERY

BACKGROUND OF THE INVENTION

This invention is useful in fields requiring plant leaf orientation or alignment, and is especially suitable for tobacco leaf aligning.

In the processing of tobacco it is important to orient the leaves uniformly before they are fed to the threshing or stripping operation, so that their stems or midribs are approximately parallel. When the tobacco leaf is mechanically stripped or threshed from its stem a portion of tobacco may be wasted, unless the leaf is properly aligned. If the leaf is aligned, the threshing teeth or knife cuts or knocks off a larger strip of tobacco in the first stage of threshing, thereby giving less scrap, producing larger size strip, improving overall yield, eliminating resorting hand labor, and eliminating back-up equipment presently used. Proper alignment can probably eliminate the last two stages of a five-stage threshing operation.

Heretofore, hand labor has been extensively utilized to orient the leaves prior to their introduction into a tipping machine and/or threshing machine.

Presently, to get enough size in a tobacco strip, the leaf has to be tipped to 4 to 8 inches. To perform this operation, the leaf is commonly laid by hand on a belt and aligned to go through the tipping knife, which is a considerable expense in the overall operation. The lower parts of the leaves which remain after tipping are sent into a threshing operation in a random manner and the subsequent sizes are relatively small. This threshed product is then blended with the tips to make up the overall strip.

More recently, complex mechanical devices have been used to orient leaves, but these have been impractical and expensive in relation to capacity required, and they have not been widely accepted.

SUMMARY OF THE INVENTION

The invention includes machinery for receiving randomly oriented infed leaves and for aligning them by a combination of operations.

A surface is provided onto which leaves are deposited in random fashion. A vibratory drive means is connected to urge the leaves forward or convey them towards a series of upwardly open troughs or channels.

The driving means imparts vibratory motion to the carrying surfaces on which the leaves ride. These surfaces are moved with at least a component of motion in a downstream direction so that the leaves are moved from the receiving end of the machine onto and along the troughs.

Doffer or rotating arm means which preferably rotate in a direction opposite to the flow of tobacco are provided in proximity to the troughs for jostling, brushing or otherwise reorienting the leaves. Air outlets or orifices are preferably provided, spaced in or near the troughs or in the rotating arms and establish air streams towards the leaves which assist in jostling, lifting or otherwise reorienting them. The troughs are somewhat narrower than the normal length of the leaves and the combination of the reorienting effects of the doffer means and air orifices reorients the leaves until they are aligned and lie longitudinally in the troughs. The motion of the driving means may also tend to turn or reorient the leaves until they are properly aligned in the troughs.

If the flow of tobacco is not uniform onto the vibrating conveyor-leaf aligner, the series of rotating doffers will improve the evenness of the flow both laterally and longitudinally, as well as align the leaves coming off the aligning machine. Maintenance of a uniform flow has, in the past, been difficult to attain.

The troughs which receive leaves from the receiving surface may be generally U- or V-shaped and are positioned so that their rims are level with or slightly below the edge of the leaf receiving surface, to receive leaves conveyed therefrom. Both the troughs and the receiving surface receive conveying motion from the vibratory driving means.

When the leaves reach the troughs, those that have their stems aligned longitudinally will fall into the troughs. The skew or nonaligned leaves will lie across the trough tops and will be subject to the lifting effects of the air orifices and the turning and moving effect of doffer means. The vibratory drive conveys the nonaligned leaves along the trough tops or rims, and the aligned leaves are conveyed in the troughs.

The doffer means may include one or more hubs, rotatably mounted in proximity and transverse to the troughs. A plurality of arms extend from each hub towards the troughs and tend to brush or rake the leaves backwardly or upstream. The arms may be staggered or off-center with respect to the trough centers such that they have a pivoting effect on the leaves tending to turn them into proper alignment. The ends of the arms on the respective hubs vary in distance from the trough tops. This allows more nonaligned leaves, for instance, to pass under the first doffer means while the second doffer brushes more nonaligned leaves from the accumulation, and so on to the last doffer. The arm ends of the last doffer extend to or below the trough tops and thereby permit very few leaves to pass the apparatus in a nonaligned position. Air outlets may be provided in each arm for also moving the tobacco in an advantageous manner.

A modified construction is provided wherein each hub is vertically adjustable, while operating, independently of the others. This allows it to be raised quickly to allow any backlog of nonaligned leaves to continue downstream.

A series of air orifices or outlets are positioned in proximity to the troughs. Pressure air is supplied to these outlets so that a flow at each outlet lifts any leaf passing above it. This tends to blow or reorient the leaf so that it may be repositioned and thus fall, if aligned, into the trough. The air orifices may be staggered with respect to each other so that only one part of an overlying leaf is raised, thus tending to turn a nonaligned leaf into aligned position.

It is thus an object of the invention to provide a simple, economical and yet efficient mechanical apparatus to align tobacco leaves and to improve uniformity of flow thereof.

It is a further object of the invention to provide a leaf aligner for the transport and alignment of tobacco leaves which utilizes staggered doffer means to turn and reorient leaves not in alignment.

It is a further object of the invention to provide a leaf aligner for the transport and alignment of tobacco leaves which utilizes staggered air outlets to assist in turning and aligning the leaves.

It is a further object of the invention to provide a leaf aligner which orients tobacco leaves with a system of rotatable arms and staggered air outlets.

It is a further object of the invention to provide a device for aligning tobacco leaves using vibrating-type carrying surfaces, a series of staggered air outlets in proximity to said surfaces and rotatable arms, also with air outlets, which arms are positioned at gradually decreasing heights so that the ends of the last arms are at least level with the trough tops.

It is a further object of the invention to provide a method of aligning tobacco leaves in an efficient, simple and inexpensive manner.

These and other objects and advantages of the present invention will be more readily apparent from a consideration of the following detailed description of the drawings illustrating a preferred embodiment of the invention.

Figure 1:
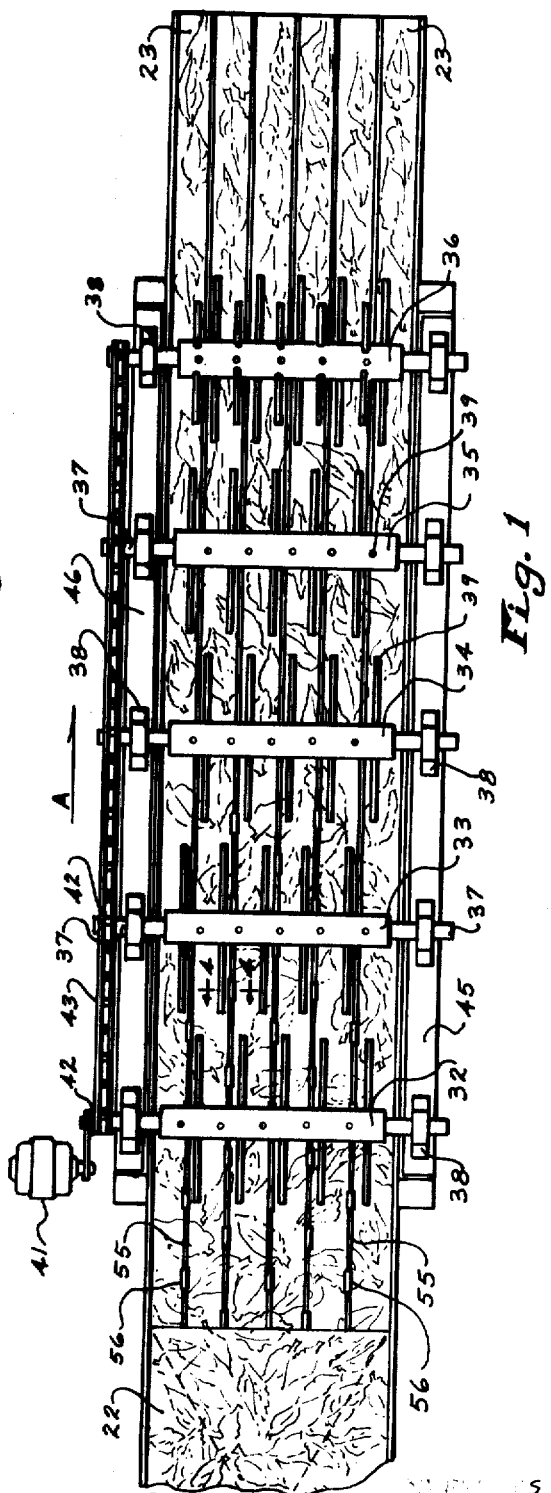
FIG. 1 is a top plan view of a preferred form of the invention.
Figure 2:
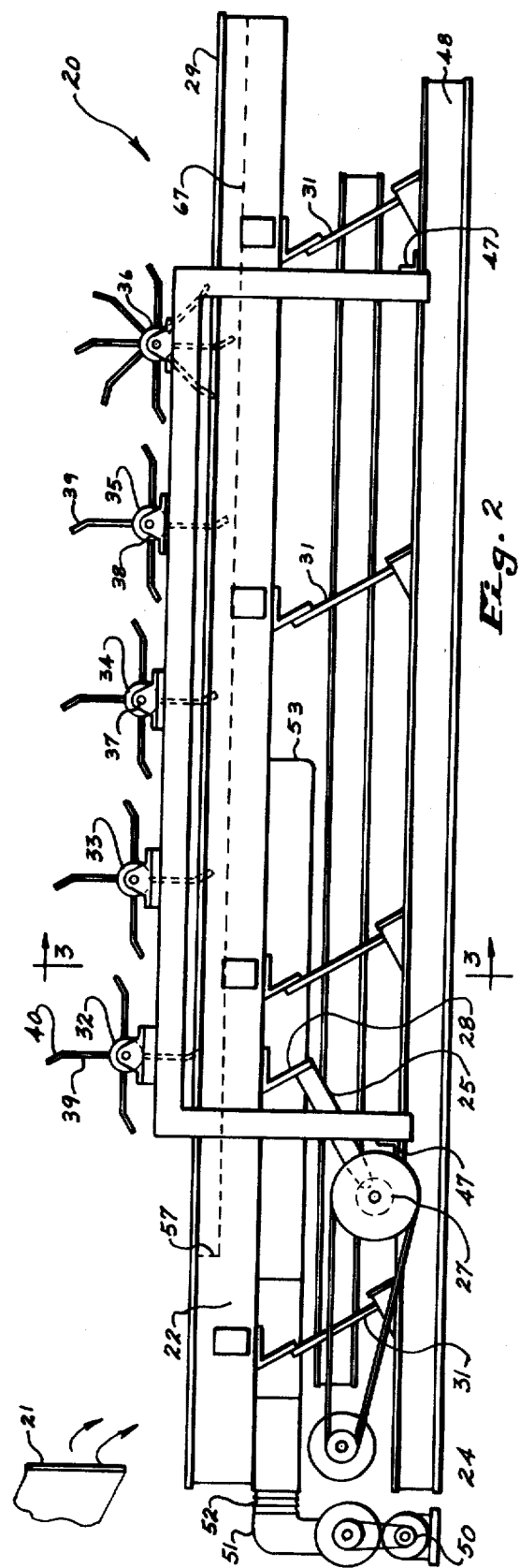
FIG. 2 is a side view of the machine shown in FIG. 1.

The leaf aligner is best seen in FIGS. 1 and 2 wherein 20 designates the aligner in general. A hopper 21 feeds or discharges leaves to the aligner in random orientation. The aligner has a table or flat surface 22 which receives the infed leaves. Vibrational movement acts on the surface 22 to carry or convey the leaves from the surface toward and along a plurality of parallel troughs 23 which extend from the edge 57 of surface 22. This motion is achieved by a motor 24 driving an eccentric 26 which acts through an arm 25 on the carrying surfaces. Arm 25 is firmly attached through plate 28 to the flat carrying surface 22 and the parallel troughs 23. The flat carrying surface 22 and the troughs 23 are carried between structural side supports 29 and 30. The assembly of the structural supports 29 and 30, the parallel troughs 23 and surface 22 is resiliently mounted on several leaf spring members 31 so that the vibratory movement of the eccentric 26 is transmitted to vibrate the table and troughs with a component of motion in the longitudinal direction of the trough. We have found a vibrational movement of about 400 cycles per minute to be sufficient. This vibrational motion causes leaves to be moved along in the general direction indicated by arrow A in FIG. 1.

The troughs 23 may be generally U- or V-shaped and their rims may be positioned level with or slightly below the edge of the leaf receiving surface 22. The troughs are preferably narrower between their rims than the usual, normal or average length of the leaves.

Figure 3:
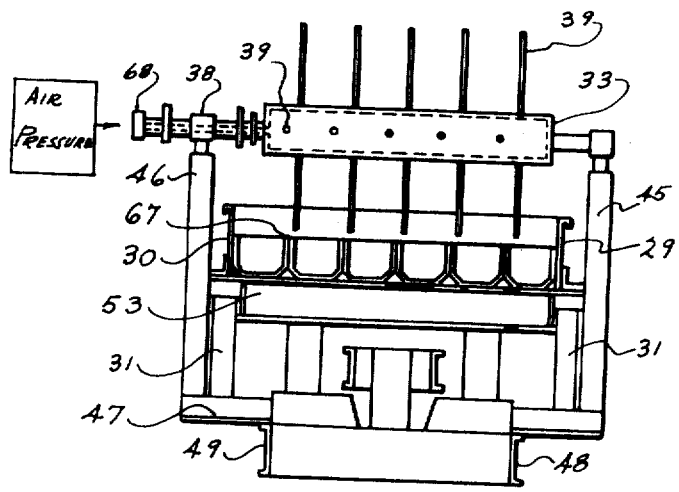
FIG. 3 is a vertical section taken along line 3—3 of FIG. 2.
Figure 7:
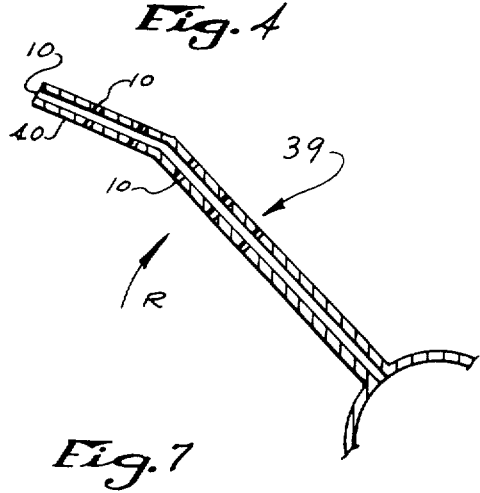
FIG. 7 is a detail of a rotatable arm.

A series (five in the embodiment shown) of leaf-engaging rotating means or doffers are mounted transversely above parallel troughs 23. Each includes a hub 32–36, supported on a shaft 37 journalled in bearings 38. Each hub supports a plurality of outwardly projecting or radially mounted arms, paddles or rods 39 which may range from seven-sixteenths to one-half inch in diameter, however other sizes may be used. Each arm 39 has angled tips 40. The arms may be positioned to project in four equiangular radial directions on the first four hubs and in eight directions on the last hub. Of course, the arms may be staggered in many radial directions. As shown in FIG. 7, the arms 39 may be hollow and air outlets 10 may be provided at locations along the arms 39, along the angled tips 40 or at the end of angled tips 40. Air flowing through these outlets will tend to also jostle or move the leaves into proper position for alignment as the arm 39 rotates in the direction of arrow R. Compressed air may be supplied to these outlets through the hubs and arms. As shown in FIG. 3, air pressure is supplied through an appropriate swivel connector 68 shown diagrammatically. The hubs may be hollow as shown or may be constructed with air channels providing a passage to each of the arms 39.

The hubs are driven by a motor 41 through a driving engagement with shaft 37 of hub 32. Each shaft 37 has a sprocket 42 mounted on its end and a chain 43 drives each sprocket. Thus, shaft 37 of hub 32 is directly driven by motor 41 and sprocket 42 on this same shaft imparts the rotation to chain 43 and the other sprockets 42, thereby driving the remaining hubs 33–36. The hubs are driven in a clockwise direction as seen in FIG. 2 so that the rods 39 move the leaves oppositely to the normal direction of leave conveyance. We have found that driving the sequential hubs at increasing speeds increases efficiency. Sprocket sizes are preferably chosen to drive the first hub at about 70 r.p.m. and the following hubs at increasing speeds with the last or downstream hub 36 rotating at about 120 r.p.m.

As best seen in FIG. 2, the hubs 32–36 are mounted at gradually decreasing heights above the troughs. Thus, the angled tips 40 of arms or rods 39 on the first or upstream hub 32 are actually above the plane of the trough tops or rims 67 when in their down position, and angled tips 40 depending from the last or downstream hub 36 are approximately even with trough rims 43 when in their downward position and engage leaves lying across the trough rims. Blocks or shims 44 may be used under bearings 38 so as to establish the desired heights of hubs 32–36. We have found that positioning the arms from the first hub 2 inches above the trough rims and the arms from the last hub about one-half inch into the troughs is an effective range. It is to be noted that the arms do not contact the leaves aligned in the troughs and hence, no unnecessary forces are imparted to the leaves which may injure them. Bearings 38 are mounted on support beams 45 and 46 which are rigidly supported by cross-pieces 47 on floor beams 48 and 49. The hubs do not receive vibrations imparted to surface 22 and troughs 23.

An air pressure blower unit, shown generally at 50, provides pressure air which is applied through duct 51, flexible joint 52, and duct or plenum 53 to passages and air outlets located at intervals along the troughs 23. Flexible joint 52 isolates duct 51 and blower 50 from the source of vibration acting on the table. The blower may also provide air to the outlets in the arms 39.

Figure 4:
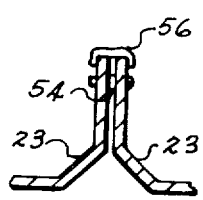
FIG. 4 is an enlarged vertical section taken along line 4—4 of FIG. 1, showing a cross-section of the trough and air outlet.

As best seen in FIG. 4, the side walls of adjacent troughs 23 are slightly separated from each other by spacers 54. Air outlets 55 are preferably provided at random or staggered locations in the trough rims, although they may be placed within the troughs themselves. This can be done by closing areas in the rims between the troughs where no air flow is desired, and may be accomplished by making appropriate openings in the materials used for the troughs. If the troughs are separately made, covers 56 are used to cover the space between the troughs and are placed to leave staggered outlets. The staggering or non-symmetry of the outlet positions from rim to rim is shown in FIG. 1. Air duct 53 extends to a position between hubs 33 and 34 for providing air to the outlets.

It should be noted that while the provision of the air outlets increases the aligning rate and efficiency as well as total output, they are not essential to achieving a useful degree of alignment, and the air streams may be omitted altogether. We have found that alignment with air streams operating is about 98 percent and that alignment without air is about 92 percent. We have found in tests that total output with air flow is about 3,000 pounds per hour while air flow output runs between 2,800 and 2,900 pounds per hour, and we believe that substantially higher outputs can be achieved by a number of variations which will become apparent, in light of this specification, to those of ordinary skill in the art.

In operation, tobacco leaves are deposited from hopper 21 onto surface 22 in random fashion. They are conveyed onto the troughs by vibrational movement from the vibratory drive. When the leaves reach the edge 57 of surface 22, leaves which are aligned with their stems or midribs parallel to the troughs drop into the troughs. Leaves which are not oriented tend to lie across the trough tops, the trough being narrower than the leaves are long. Leaves in the troughs and on the rims are conveyed in the direction of arrow A. As the nonaligned leaves move toward hub 32, they are gently lifted by air outlets 55. Since these outlets are staggered, one end is lifted more than the other and the leaf tends to pivot or turn so as to drop into the trough. The angulation of the side walls adjacent to the trough aids in orienting. Remaining nonaligned leaves on the rims are carried under hub 32 where the angled tips 40 of rods 39 brush or sweep the top leaves back against their normal flow and reorient them in the process. Since the rods 39 are staggered or offset with respect to the trough centers (see FIG. 3) they exert a turning or pivoting movement on the leaves which of itself reorients them, and properly oriented leaves fall longitudinally into the troughs. Air outlets 10 tend to also turn or reorient the leaves.

Some nonaligned leaves may be carried under the rods or arms mounted on hub 32 and move toward hub 33. The air outlets 55 and 10 and the rods on hub 33 also tend to jostle and turn these leaves so that they are realigned. The arms of hub 33 are projected closer to the rims than are those of hub 32, so that fewer of the nonaligned leaves can pass thereunder towards hub 34. Air outlets 55 extend to a position between hubs 33 and 34. Since the arm of hubs 34–36 project increasingly lower, fewer leaves can pass under them in nonaligned manner on the trough rims. Hub 36 is mounted so that angled tips 40 are even with the trough tops and thus any leaves remaining in nonaligned fashion are swept or brushed back until they are oriented and fall into the troughs. Thus, the number of nonaligned leaves is gradually decreased so that all leaves are finally aligned and ready for feeding to the processing operation.

We have found that the angling of the rods 39 more efficiently keeps the tobacco leaves from "roping" or rolling up during this process and that an angle from 15° to 20° is surprisingly effective in this respect. Each rod may have a different angle so as to eliminate "roping" in front of the doffers.

Figure 5:
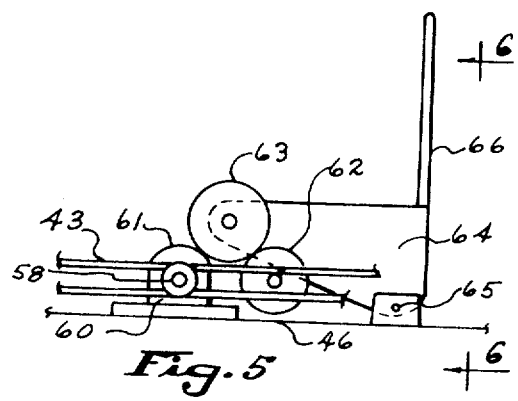
FIG. 5 is a side view showing modified doffer mounting structure.
Figure 6:
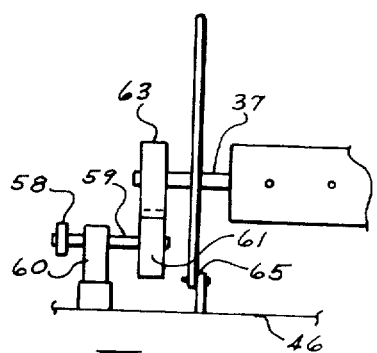
FIG. 6 is a partial vertical section taken along line 6—6 of FIG. 5.

An alternate mounting of the hubs is shown in FIGS. 5 and 6; this mounting permits the hub to be raised if desired in order to pass any backlog or "rope." These accumulations may be dissipated by the vibrations, doffers and air streams further downstream. Sprocket 58 receives motion from driving chain 42. Sprocket 58 is mounted on a shaft 59 journalled in bearing 60 which is rigidly mounted on the frame 46 (FIG. 1). Gear 61 is mounted on the other side of bearing 60. Gear 62 is an idler gear also rotatably mounted on frame 46 and for clarity is omitted in FIG. 6. Gear 63 is mounted for driving engagement on shaft 37 on which a hub is mounted. A plate 64 is pivotally mounted at 65 on frame 46. Shaft 37 is journalled in plate 64. A handle 66 is attached to plate 64 and may be moved to pivot plate 64 about pivot 65 and thereby lift shaft 37 in a generally vertical direction. The other end of shaft 37 is journalled in a like plate which is simultaneously pivoted by an operator on the other side of shaft 37 and two ilder gears may be provided to support it.

This construction, when used to mount the hubs, allows a user immediately to raise one or more hubs if the backlog of nonaligned leaves at that position becomes too great and tends to delay the operation. Of course, some automatic means or controls may be employed in order to allow this independent operation of each doffer at some distance from the machine itself. Furthermore, each doffer may be provided with a reversible drive operable to reverse the doffer's rotation and break up the backlog of leaves.

Having described our invention, we claim:

1. A method for aligning leaves such as tobacco leaves including the steps of
   depositing leaves on a leaf receiving surface,
   segregating leaves which are aligned along a desired direction from those which are not aligned, by conveying the unaligned leaves from said surface onto and longitudinally along a series of parallel rims while aligned leaves fall between the rims into receiving troughs,
   turning unaligned leaves lying across the rims by applying a positive turning force on said leaves, while exerting a longitudinal conveying force to the rims so that said leaves are conveyed along the rims, and realigned until they fall aligned into the troughs,
   and conveying the aligned leaves longitudinally along and out of the troughs.

2. A method for aligning leaves such as tobacco leaves including the steps of
   depositing leaves on a leaf receiving surface,
   segregating leaves which are aligned along a desired direction from those which are not aligned, by conveying the unaligned leaves from said surface onto and longitudinally along a series of parallel rims while aligned leaves fall between the rims into receiving troughs,
   turning unaligned leaves lying across the rims while said leaves are being conveyed along the rims, to realign them until they fall aligned into the troughs,
   conveying the aligned leaves longitudinally along and out of the troughs, and
   subjecting unaligned leaves being conveyed on the rims to nonuniform air streams to move and realign them.

3. The method of claim 2 wherein subjecting the unaligned leaves to nonuniform air streams includes the step of blowing air through the trough rims for lifting and realigning them.

4. The method of claim 2 wherein subjecting the unaligned leaves to nonuniform air streams includes the step of blowing the air through a turning means and onto the leaves.

5. A method for aligning leaves such as tobacco leaves including the steps of
   depositing leaves on a leaf receiving surface,
   segregating leaves which are aligned along a desired direction from those which are not aligned, by conveying the unaligned leaves from said surface onto and longitudinally along a series of parallel rims while aligned leaves fall between the rims into receiving troughs,
   turning unaligned leaves lying across the rims while said leaves are being conveyed along the rims, by applying off-center turning forces, adjacent said rims and turning and brushing the leaves thereby, to realign them until they fall aligned into the troughs,
   and conveying the aligned leaves longitudinally along and out of the troughs.

6. A method for aligning leaves such as tobacco leaves including the steps of
   depositing leaves on a leaf receiving surface,
   segregating leaves which are aligned along a desired direction from those which are not aligned, by conveying the unaligned leaves from said surface onto a series of parallel rims while aligned leaves fall between the rims into receiving troughs,
   turning unaligned leaves lying across the rims to realign them until they fall aligned into the troughs, said turning being carried out by applying off-center turning forces, adjacent said rims and turning and brushing the leaves thereby,
   terminating said brushing and turning when a backlog of unaligned leaves accumulates on said rims,
   and conveying the aligned leaves along and out of the troughs.

7. Machinery for aligning leaves such as tobacco leaves including,
   means presenting a surface for receiving infed leaves,
   a plurality of parallel troughs separated by trough rims which extend longitudinally from an edge of said surface, each trough between its rims being narrower than the average length of the leaves, said rims disposed to receive and support unaligned leaves from said surface which are skew to said troughs,
   conveying means acting longitudinally on the surface, troughs and rims to convey leaves from the surface onto and longitudinally along the troughs and rims,
   and rotating means transverse to the troughs and rims for engaging and reorienting unaligned leaves lying across the trough rims.

8. The machinery of claim 7 further comprising air outlets positioned to act on unaligned leaves on the rims,
   and means for supplying pressure air to said outlets.

9. The machinery of claim 8 wherein said air outlets are staggered to exert nonuniform lifting force on leaves proximate thereto.

10. Machinery for aligning leaves such as tobacco leaves including,
    means presenting a surface for receiving infed leaves,
    a plurality of parallel troughs extending from an edge of said surface, the respective troughs separated by trough rims, each trough between its rims being narrower than the average length of the leaves, said rims disposed to receive and support unaligned leaves from said surface which are skew to said troughs,
    conveying means acting on the surface, troughs and rims to convey leaves from the surface onto and along the troughs and rims,
    air outlets positioned to act on unaligned leaves on the rims, said air outlets being located in the rims between said troughs,
    means for supplying pressure air to said outlets,
    and rotating means transverse to the troughs and rims for engaging and reorienting unaligned leaves lying across the trough rims.

11. Machinery for aligning leaves such as tobacco leaves including,
    means presenting a surface for receiving infed leaves, a plurality of parallel troughs extending from an edge of said surface, the respective troughs separated by trough rims, each trough between its rims being narrower than the average length of the leaves, said rims disposed to receive and support unaligned leaves from said surface which are skew to said troughs, conveying means acting on the surface, troughs and rims to convey leaves from the surface onto and along the troughs and rims, rotating means transverse to the troughs and rims for engaging and reorienting unaligned leaves lying across the trough rims, said rotating means comprising at least one hub transverse to and above the troughs and rims, and a plurality of arms projecting outwardly from the hub and engaging leaves lying above a trough on the rims.

12. The machinery of claim 11 further comprising air outlets formed along and at the end of said arms, and means for supplying pressure air to said outlets.

13. The machinery of claim 11 wherein a series of transverse hubs and projecting arms are provided at spaced positions along the longitudinal dimension of said troughs, the ends of the arms of the respective hubs of said series extending progressively closer to the trough rims, and the arms of the last hub being at least even with the rims when those arms are in their down position.

14. The machinery of claim 13 further comprising means for raising at least one of said hubs from its normal position, while said machinery is in use, sufficiently to permit an excess of leaves on the rims of said troughs to pass beneath the arms of the hub without being engaged by its arms.

* * * * *